United States Patent
Machida

(10) Patent No.: US 6,411,022 B1
(45) Date of Patent: Jun. 25, 2002

(54) VEHICLE LAMP UNIT

(75) Inventor: Tsutomu Machida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/634,946

(22) Filed: Aug. 7, 2000

(30) Foreign Application Priority Data

Aug. 27, 1999 (JP) .......................................... 11-241424

(51) Int. Cl.[7] ............................................... H01R 33/00
(52) U.S. Cl. ..................... 313/318.1; 362/800; 362/249; 340/479
(58) Field of Search ....................... 313/318.01, 318.09, 313/318.1; 362/800, 249; 340/479

(56) References Cited

U.S. PATENT DOCUMENTS

| 5,068,771 A | * | 11/1991 | Savage, Jr. ................. 362/800 |
| 5,700,080 A | * | 12/1997 | Okuda ........................ 362/800 |
| 5,746,497 A | | 5/1998 | Machida ...................... 362/80 |
| 5,762,414 A | * | 6/1998 | Montalan et al. ........... 362/800 |
| 6,045,240 A | * | 4/2000 | Hochstein ................... 362/800 |
| 6,158,882 A | * | 12/2000 | Bischoff, Jr. ................ 362/800 |
| 6,257,736 B1 | * | 7/2001 | Fehrenbach ................. 362/800 |

* cited by examiner

Primary Examiner—Michael H. Day
(74) Attorney, Agent, or Firm—Fish & Richardson P.C.

(57) ABSTRACT

A vehicle lamp unit 1 in which a plurality of light emitting diodes 13 are arranged to make up a light source is disclosed. The lamp unit includes a base member 7 for supporting a plurality of the light emitting diodes, feeder wires 14 that are disposed at the reverse side of the base member and connected to lead terminals 13$d$ of the light emitting diodes, and feeder terminals 16 connected to the feeder wires. The lamp unit advantageously realizes a cost reduction, enhances the degree of design freedom, and promotes environmental protection.

6 Claims, 6 Drawing Sheets

VEHICLE LAMP UNIT

FIELD OF THE INVENTION

The present invention relates to a novel vehicle lamp unit. Specifically, the present invention relates to a technology for making a vehicle lamp at reduced cost, while enhancing the degree of design freedom and protecting the environment.

PRIOR ART

A vehicle lamp unit having a plurality of light emitting diodes (LEDs) arranged therein to constitute a light source is well known. For example, a stop lamp that is to be provided at a specified position behind the rear windshield of a passenger car is well known as a high mount stop lamp.

This vehicle lamp unit using LEDs as its light source generally has a structure as shown in FIG. 6. The structure includes a printed circuit board (d) disposed in a lamp chamber (c) defined by a lens (a) and a body (b) which covers the reverse side of the lens (a), and a number of LEDs (e) that are supported by soldering terminals (f) on the printed board (d) to construct the vehicle lamp unit.

This conventional vehicle lamp unit presents a problem of a limited degree of design freedom. The printed circuit board (d) supports the LEDs (e), making it difficult to design the circuit board (d) in an arbitrary shape, especially in the thickness thereof. Accordingly, the manufacture of such lamp units having a part substantially bent in the direction of its depth and the like is problematic. Moreover, the printed circuit board is expensive and soldering adds to the cost in equipment and production, hence pushing up the manufacturing cost of the whole conventional vehicle lamp unit. In addition, soldering is undesirable from the viewpoint of environmental protection.

SUMMARY OF THE INVENTION

It is an object of the present invention to realize cost reduction, an enhanced degree of design freedom, and environmental protection in the production of a vehicle lamp unit.

In order to solve the above-mentioned problems, a vehicle lamp unit according to the present invention includes a base member for supporting a plurality of LEDs, feeder wires that are disposed at the reverse side of the base member and connected to lead terminals of the respective LEDs, and feeder terminals connected to the feeder wires.

Therefore, in the vehicle lamp unit according to the present invention, if the base member for supporting the LEDs is formed as a molded resin article, its shape can be freely chosen and design freedom is enhanced. Moreover, the terminals of the light emitting diodes and the feeder wires can be connected with each other by means other than soldering, for example by welding, thus coping with environmental issues.

DETAILED DESCRIPTION

Figure 1:
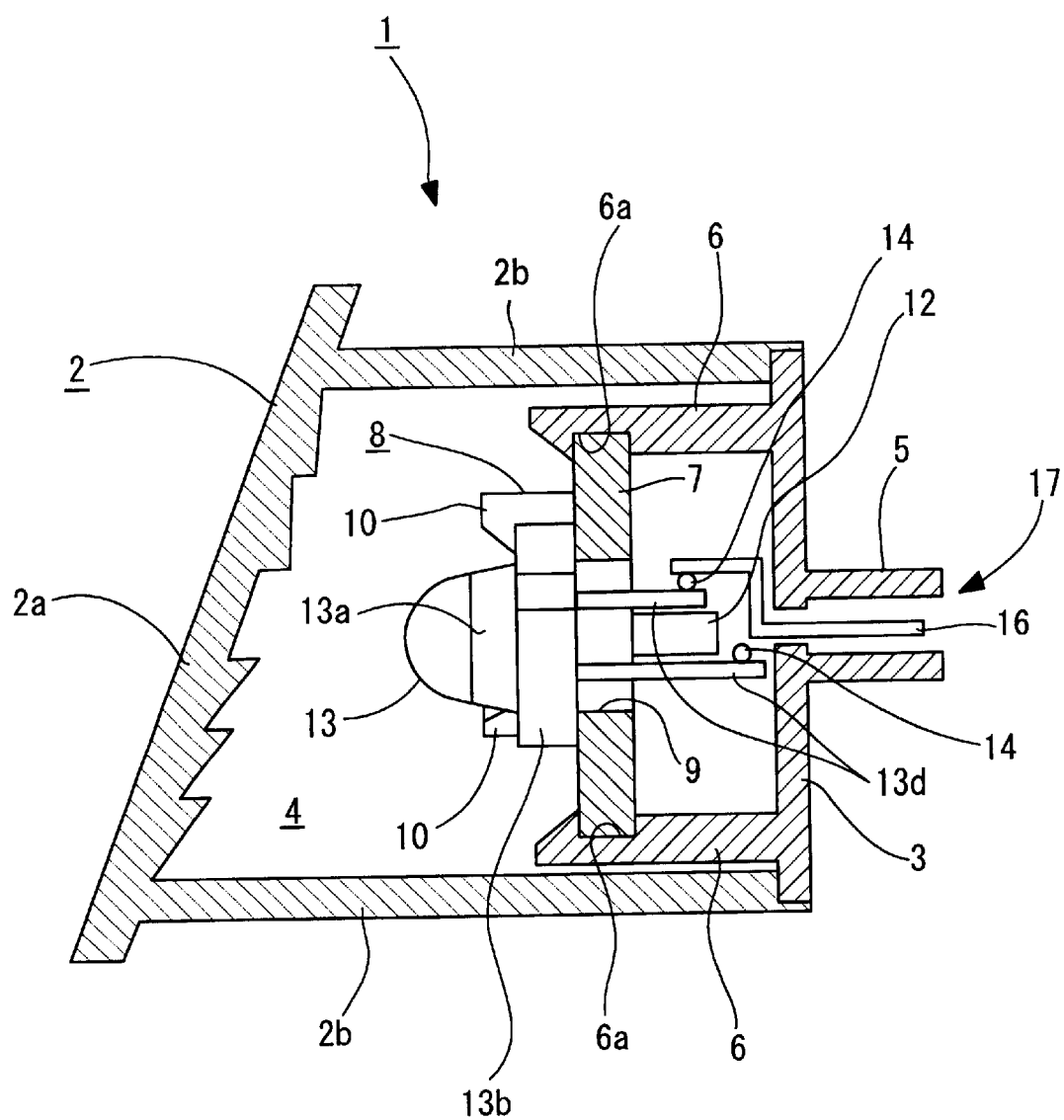
FIG. 1 is a cross sectional view showing the essential portion of one embodiment of the vehicle lamp unit according to the present invention.

A vehicle lamp unit 1 shown in FIG. 1 is formed as being applied to a high mount stop lamp, that is, a stop lamp to be provided at a specified position behind the rear windshield of an automobile.

In the vehicle lamp unit 1, the rear end of a lens 2 is covered with a body 3, such that lamp chamber 4 is defined thereby. The lens member 2 may be a single structural unit formed by integrally combining a red-colored and transparent synthetic resin in which the front portion 2a extends laterally, and peripheral wall portions 2b extend rearward from the top and bottom edges of the front portion 2a. To the back ends of the wall portions 2b is attached a body 3 that has a plate-like shape and, with the lens 2 and its walls 2b, defines the lamp chamber 4. A sleeve 5 extending backwards from the body 3 may be integrally formed therewith.

Support walls 6 are provided on the upper and lower edge portions of the front side of the body 3 so as to extend towards the lens's front portion 2a. Support grooves 6a facing each other are formed near the ends of the support walls 6.

A base member 7 is provided at a specified position in the lamp chamber 4. The base member 7 is formed from as a synthetic resin molded article having a plate-like shape extending laterally, and is supported by bringing its upper and lower edges into engagement with the support grooves 6a of the support walls 6 of the body 3.

Figure 2:
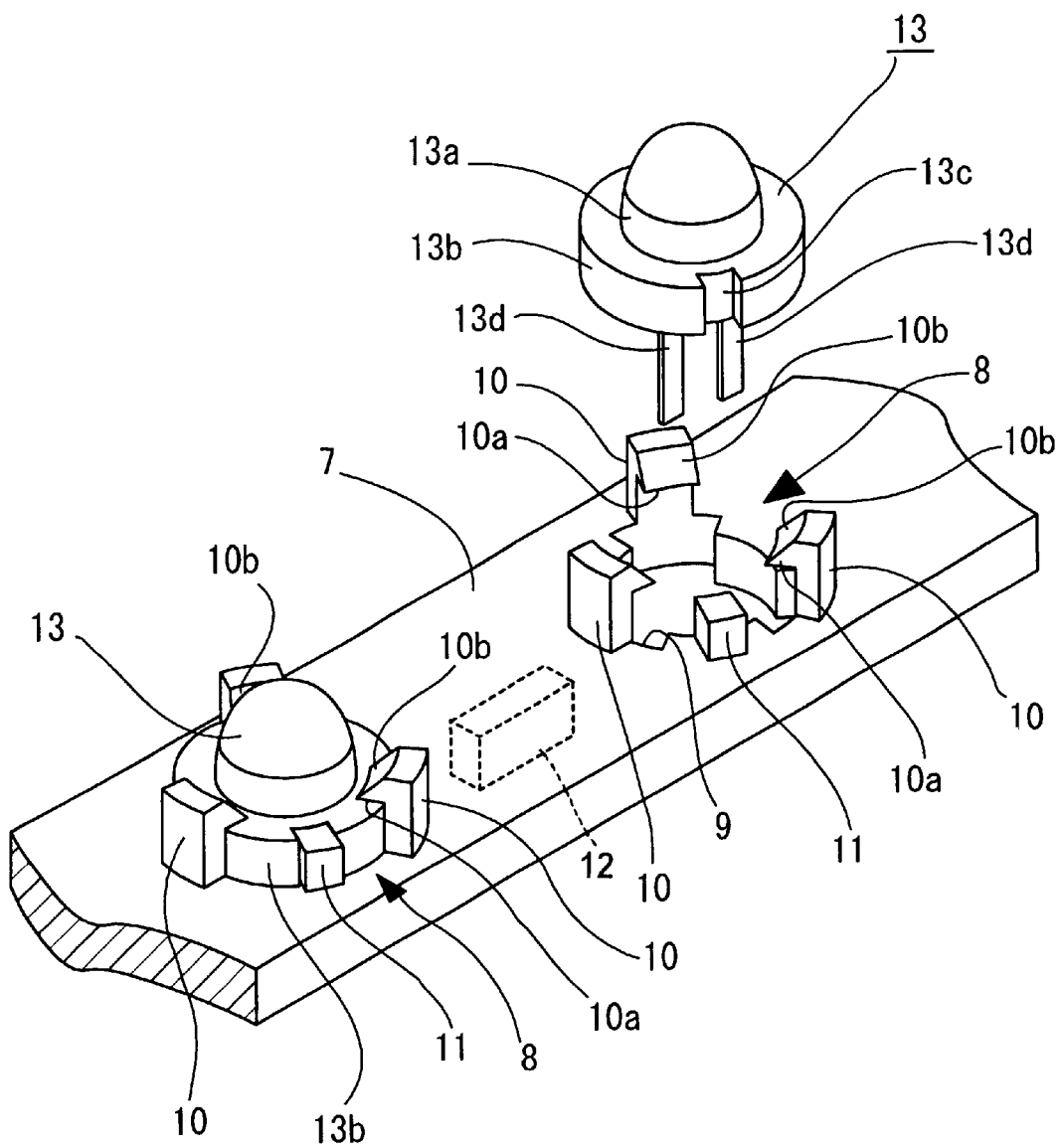
FIG. 2 is an enlarged perspective view of the essential portion of that embodiment of FIG. 1 with the LEDs, one of which is going to be mounted on the base member and the other of which has been mounted thereon.

As further illustrated in FIG. 2, the base member 7 is provided with a number of support portions 8 arranged at substantially constant intervals along its length. An insertion hole 9 is formed in each of the support portions 8 and three engaging pieces 10 are provided to protrude from the rim of the insertion hole 9 towards the front portion of the lens 2a. At the top of each of the engaging pieces 10 is formed an engaging pawl 10a that protrudes radially toward the center of the insertion hole 9. At the top of each engaging pawl 10a is formed an inclined face 10b. Also, a positioning protrusion 11 is provided on the rim of the insertion hole 9, extending towards the front portion of the lens 2a. In addition, anti-short-circuit blocks 12 (see, for example, FIGS. 1 and 3) are provided between insertion holes 9 to project from the reverse side of the base member 7.

A LED 13 is supported by each of the support portions 8 of the base member 7.

A flanged portion 13b having a substantially annular shape is formed at the bottom part of the package 13a of the LED 13 and a positioning slot 13c is formed in the flanged portion 13b. Further, two lead terminals 13d extend from the bottom end of the package 13a.

The bottom of the flanged portion 13b of the LED 13 is brought into abutment against the inclined faces 10b of the engaging pawls 10a so that the positioning slot 13c is in alignment with the positioning protrusion 11 of the support portion 8. The light emitting diode 13 is then pressed downward into the insertion hole 9, bending the engaging pieces 10 are outward. The flanged portion 13b of the light emitting diode 13 thus passes through the engaging pawls 10a, and as the positioning slot 13c slides over the positioning protrusion 11, the bottom face of the flanged portion 13b is brought against the rim of the insertion hole 9 of the base member 7. Concurrently, the engaging pieces 10 that have been bent outward are restored to their original state such that the engaging pawls 10a are engaged with the top face of the flanged portion 13b of the LED 13. In this manner, each LED 13 is supported by a corresponding support portion 8 of the base member 7. Moreover, the lead terminals 3d of each of the LEDs 13 are inserted through each of the insertion holes 9 so as to project outward from the reverse side of the base member 7.

Figure 3:
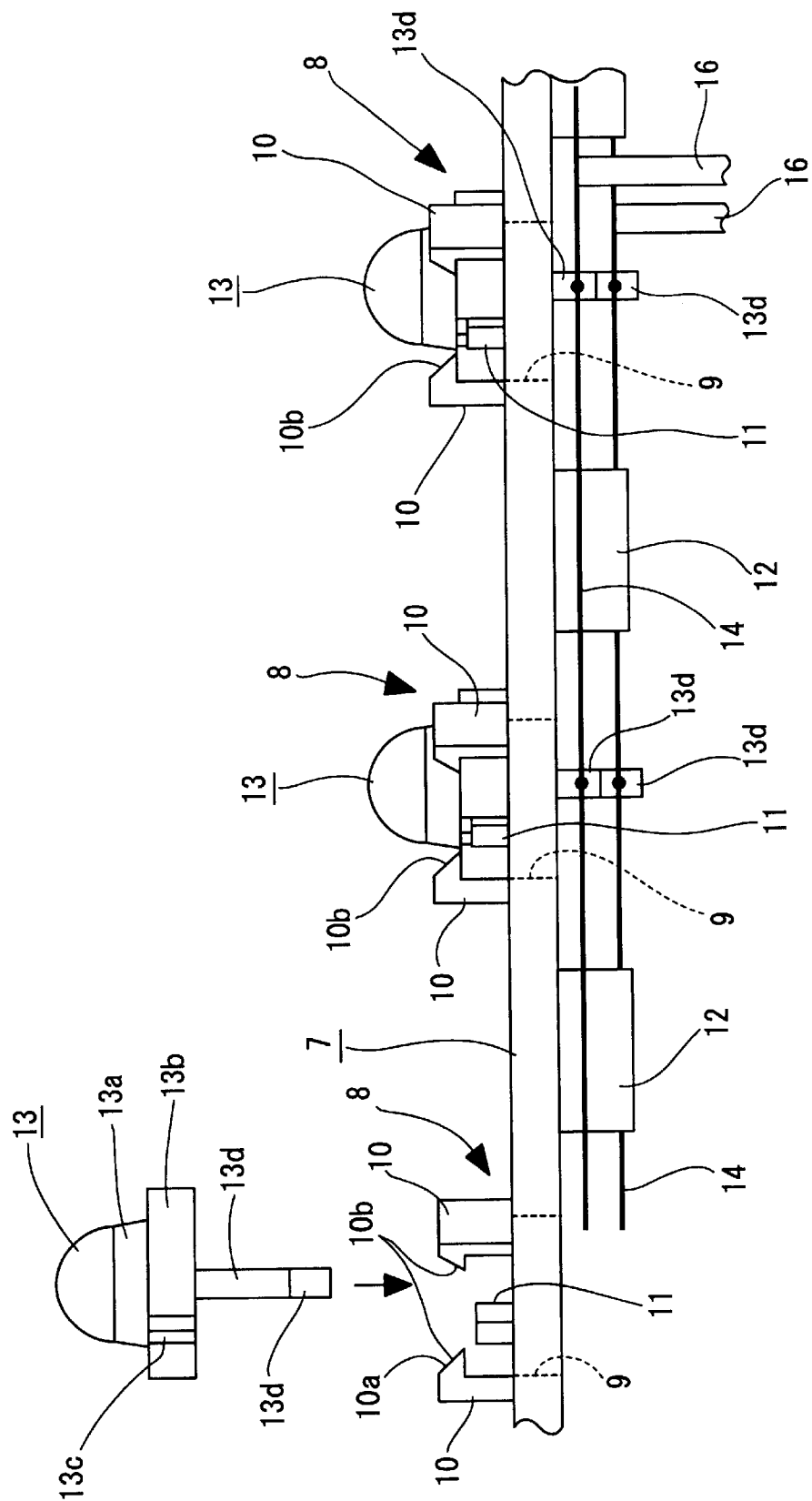
FIG. 3 is a side view of the essential portion of the vehicle lamp unit with the light emitting diodes, one of which is going to be mounted on the base member.
Figure 4:
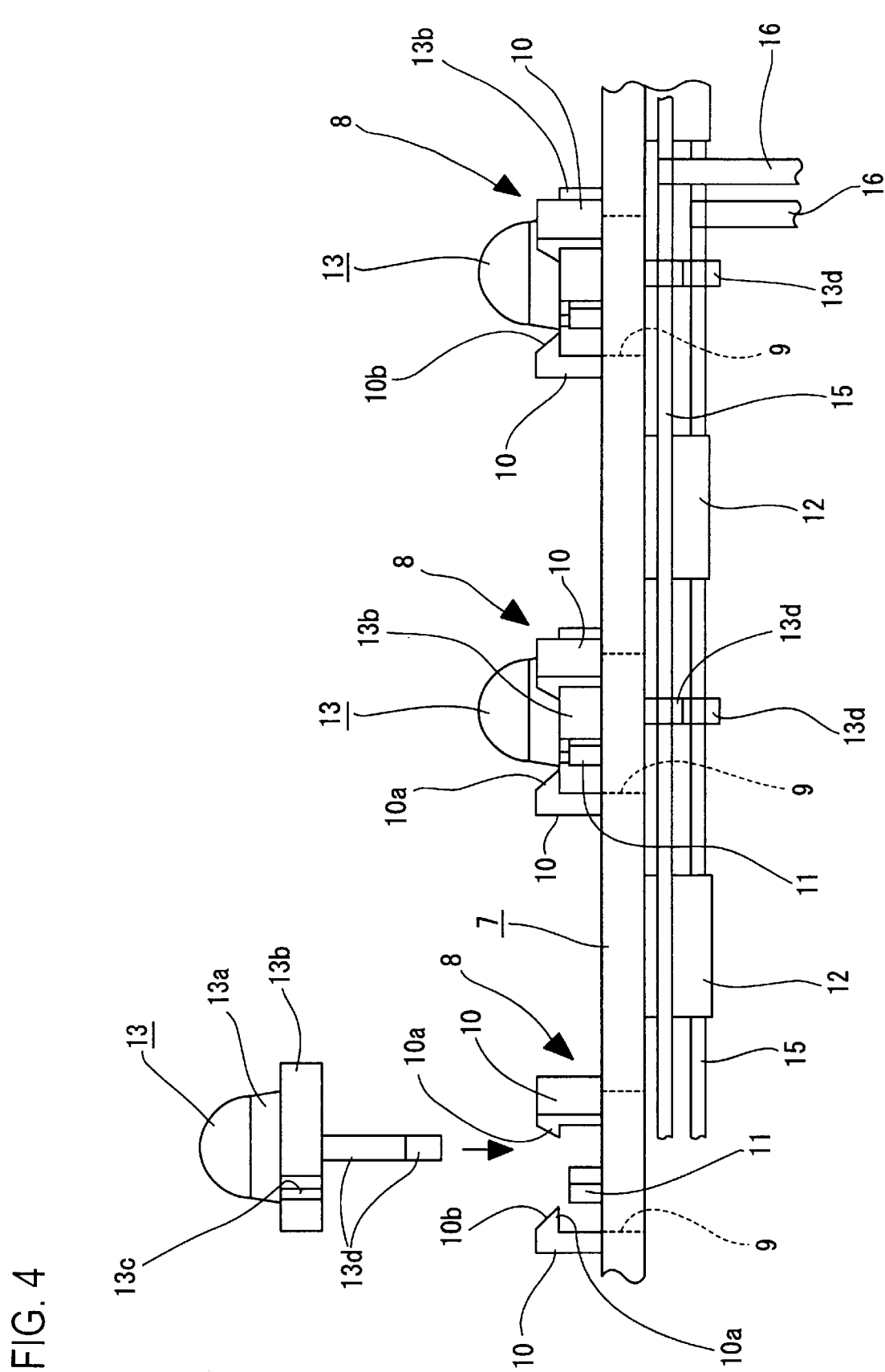
FIG. 4 is a side view of the essential portion of the vehicle lamp unit that is in the same state as that of FIG. 3, except that in this embodiment feeder wires of a different kind are used.

As shown in FIG. 3, feeder wires 14, for example enamel coated wires, are arranged in prescribed locations so as to connect with the lead terminals 13d of the LEDs 13. They may be welded to the respective lead terminals 13d using appropriate methods such as laser welding, resistance welding, etc. Further, the anti-short-circuit blocks 12 are interposed between the feeder wires 14 so as to prevent short-circuiting thereof. It should be noted that the feeder wires 14 are not supported directly by the base member 7, but supported indirectly thereby through welding to the lead terminals 13d of the LEDs 13, which are supported by the base member 7. The feeder wires 14 are not limited to the above-mentioned enamel coated wires, and various types of wires can be used. For example, referring to FIG. 4, wires 15 may be used which are in a bus bar configuration formed by spreading a copper (Cu) alloy material into a strip-like plate. One end of each of the feeder terminals 16, having major part disposed in the sleeve portion 5 of the body 3, is welded to each of the feeder wires 14. A connector 17 (see FIG. 1) is defined by these feeder terminals 16 and the sleeve portion 5 in which the feeder terminals 16 are disposed, and a power source is supplied from the outside via the above-mentioned connector 17.

Figure 5:
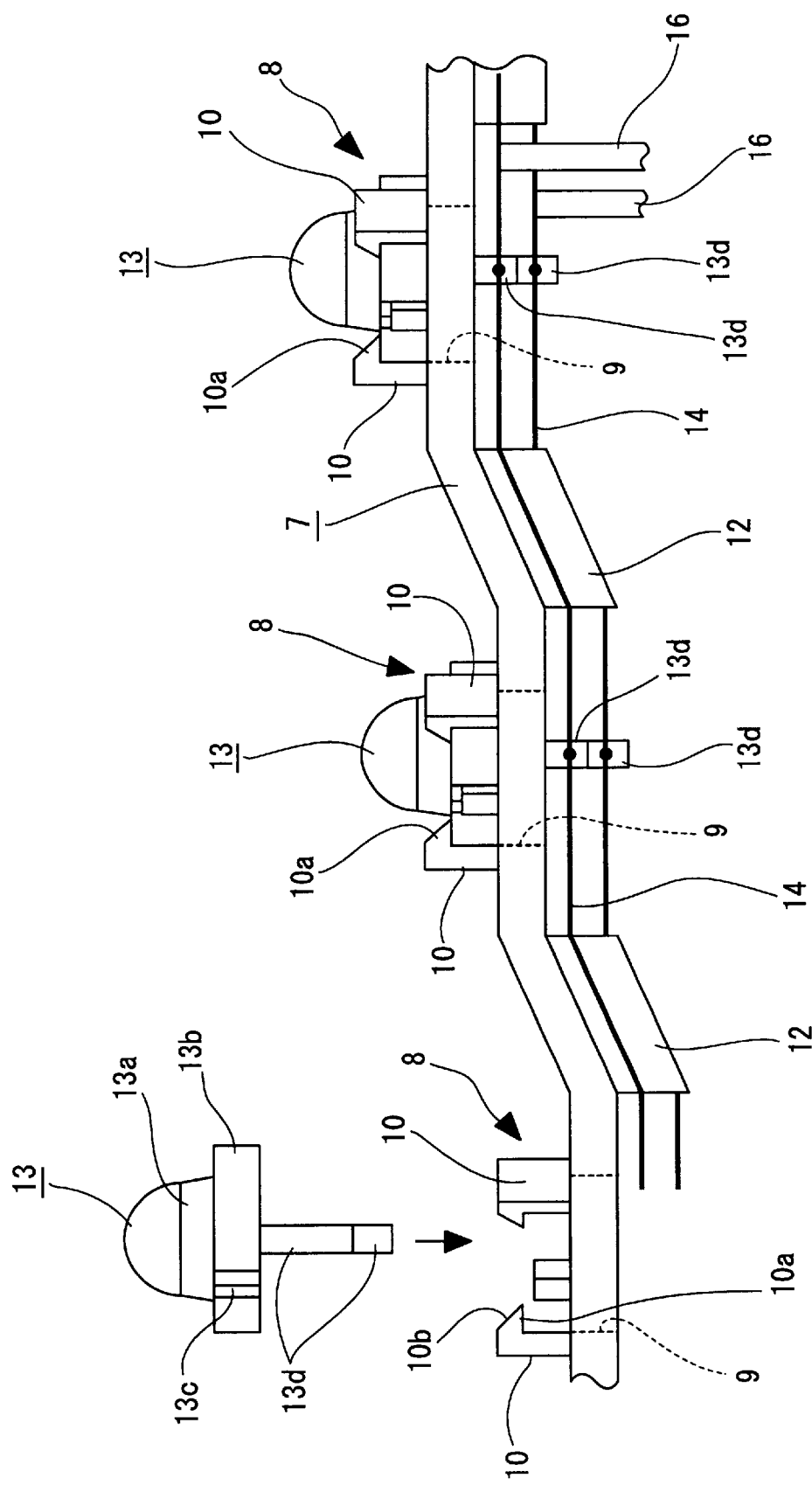
FIG. 5 is a side view of a modified implementation of the essential portion of a vehicle lamp unit.
Figure 6:
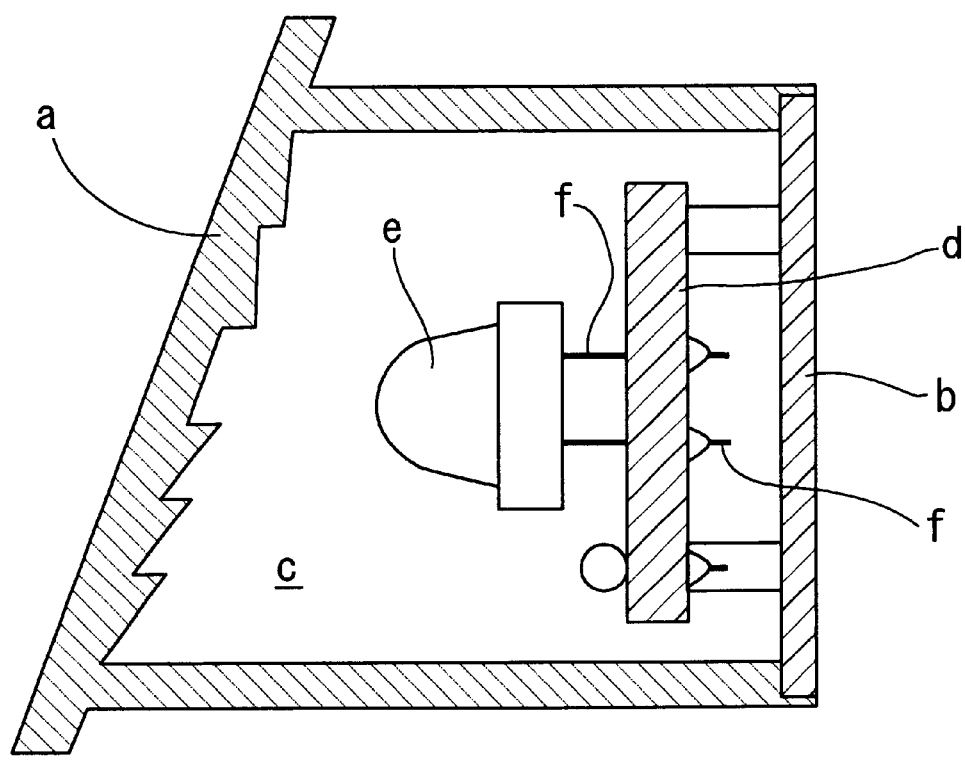
FIG. 6 is a cross section view representing one example of a conventional vehicle lamp unit.

In the above vehicle lamp unit 1, the LEDs 13 are supported not by the printed circuit board but by the base member 7, which can be designed to have an arbitrary shape. For example, the base member 7 can be formed in a step-like form as shown in FIG. 5 or the like, thus enhancing the degree of design freedom.

Further, the LEDs 13 are supported by the base member 7 through the engaging pieces 10. In this manner, this support structure for the LED 13 is more stable, as compared with the support structure used by the conventional devices, where the LED is secured to the printed circuit board only by the lead terminals thereof.

In addition, since the lead terminals 13d of the LEDs 13 and the feeder wires 14 are connected by welding, it is unlikely that environmental issues occur, as they do in the case of soldering. Furthermore, the cost can be reduced using this structure and means.

The specific shape and structure of each of the parts described in the above-mentioned embodiments are shown merely by way of example in embodying the present invention when it is carried into practice. It should be noted that the technical scope of the present invention should not so restricted.

As can be understood from the foregoing description, the vehicle lamp unit in which a plurality of LEDs are arranged to make up a light source includes a base member for supporting the plurality of the LEDs, feeder wires that are disposed at the reverse side of the base member and connected to lead terminals of the respective LEDs, and feeder terminals connected to the feeder wires.

Therefore, in the vehicle lamp unit according to the present invention, if the base member for supporting the LEDs is formed as a molded resin article, its shape can be freely chosen and thus design freedom can be enhanced. Moreover, the terminals of the light emitting diodes and the feeder wires can be connected not by soldering but by welding so that the environmental issues posed by soldering are reduced.

In an implementation, a plurality of the feeder wires are arranged in prescribed locations at the reverse side of the base member and the anti-short-circuit members are arranged between the feeder wires. The feeder wires are prevented from being short-circuited even if feeder wires having no coatings are used, or covered wires having claddings broken are used.

In a further implementation, the base member does not support the feeder wires. Thus, the support for the feeder wires imposes no constraints on the shape of the base member, making it easier to freely design its shape.

What is claimed is:

1. A vehicle lamp unit in which a plurality of light emitting diodes are arranged to make up a light source, comprising:
    a base member;
    a plurality of support portions associated with the base member, each support portion including a positioning protrusion and at least one engagement piece for supporting a plurality of the light emitting diodes;
    feeder wires that are disposed at the reverse side of the base member and connected to lead terminals of the respective light emitting diodes; and
    feeder terminals connected to the feeder wires.

2. A vehicle lamp unit according to claim 1, further comprising anti-short-circuit members interposed between the respective feeder wires.

3. A vehicle lamp unit according to claim 2, wherein the feeder wires are not supported by the base member.

4. A vehicle lamp unit according to claim 1, wherein the feeder wires are not supported by the base member.

5. A method for fabricating a vehicle lamp unit, comprising:
    forming a base member having a plurality of engaging pieces that include a positioning protrusion and at least one engagement piece;
    connecting a plurality of LED's to the engaging pieces;
    welding lead terminals of the LED's to feeder wires on the reverse side of the base member; and
    connecting the feeder wires to feeder terminals.

6. The method of claim 5, further comprising interposing anti-short circuit members between the feeder wires.

* * * * *